Figure 3:
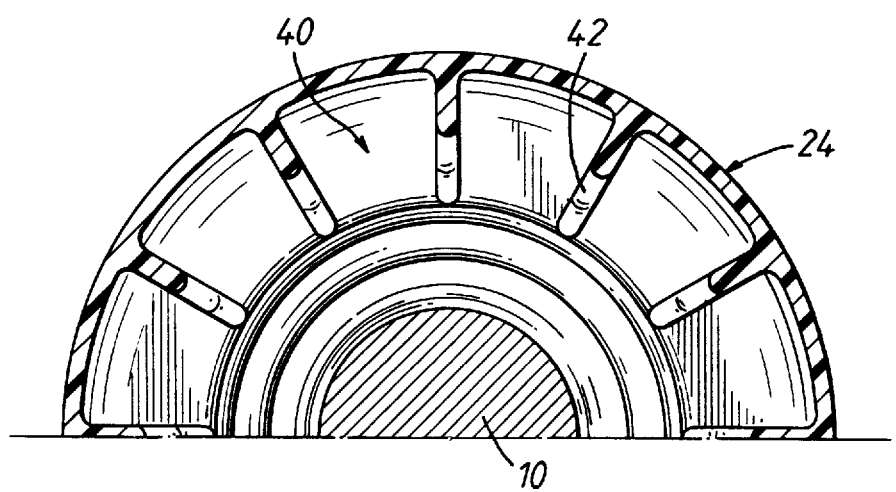

United States Patent
Breheret

[11] Patent Number: 5,879,238
[45] Date of Patent: Mar. 9, 1999

[54] PROTECTIVE BELLOWS

[75] Inventor: Joel Breheret, Treillieres, France

[73] Assignee: Draftex Industries Limited, Edinburgh, Scotland

[21] Appl. No.: 836,331

[22] PCT Filed: Nov. 10, 1995

[86] PCT No.: PCT/GB95/02641

§ 371 Date: May 9, 1997

§ 102(e) Date: May 9, 1997

[87] PCT Pub. No.: WO96/15395

PCT Pub. Date: May 23, 1996

[30] Foreign Application Priority Data

Nov. 10, 1994 [GB] United Kingdom .................. 9422701

[51] Int. Cl.⁶ ...................................................... F16D 3/84
[52] U.S. Cl. ............................................ 464/175; 277/636
[58] Field of Search ................................. 464/175, 173, 464/170; 277/212 FB, 634, 635, 636; 403/51

[56] References Cited

U.S. PATENT DOCUMENTS

| | | | |
|---|---|---|---|
| 4,378,858 | 4/1983 | Goft et al. | 464/175 X |
| 4,403,781 | 9/1983 | Riemscheid | 464/175 X |
| 4,456,269 | 6/1984 | Krude et al. | 464/175 X |
| 4,927,678 | 5/1990 | Lallement | 464/175 X |
| 5,451,186 | 9/1995 | Poulin et al. | 464/175 |

Primary Examiner—Thomas R. Hannon
Attorney, Agent, or Firm—Leydig, Voit & Mayer, Ltd.

[57] ABSTRACT

A protective bellows (24) covers over the end of, and protects the mechanism within, the casing (6) of a universal or articulated joint (5). The universal joint (5) is of normal construction, its casing (6) being drivingly connected to an output shaft (10) by ball or rollers (14) mounted in grooves (16) on an inner element (12) fixed to the output shaft (10) and in grooves (18) on the inner face of the casing (6). The balls or rollers (14) permit the desired angular movement of the axis of the output shaft (10) relative to the axis of the casing (6). In addition, a certain amount of axial movement (L) is permitted. In order to resist any tendency of this axial movement to dislodge the balls or rollers (14) from the casing (6), a rigid zone (40) is integrally molded onto the inside of the bellows (24) adjacent its large diameter end. This rigid zone (40) extends in a radial direction part way across the open end of the casing (6) to resist dislodgement of the balls or rollers (14).

17 Claims, 2 Drawing Sheets

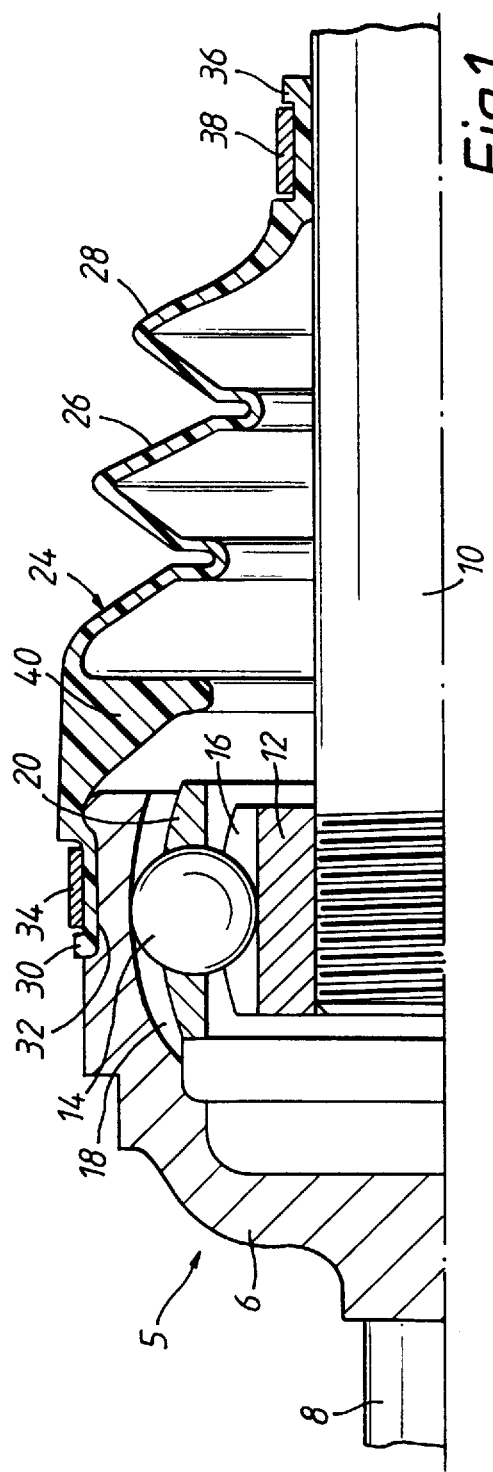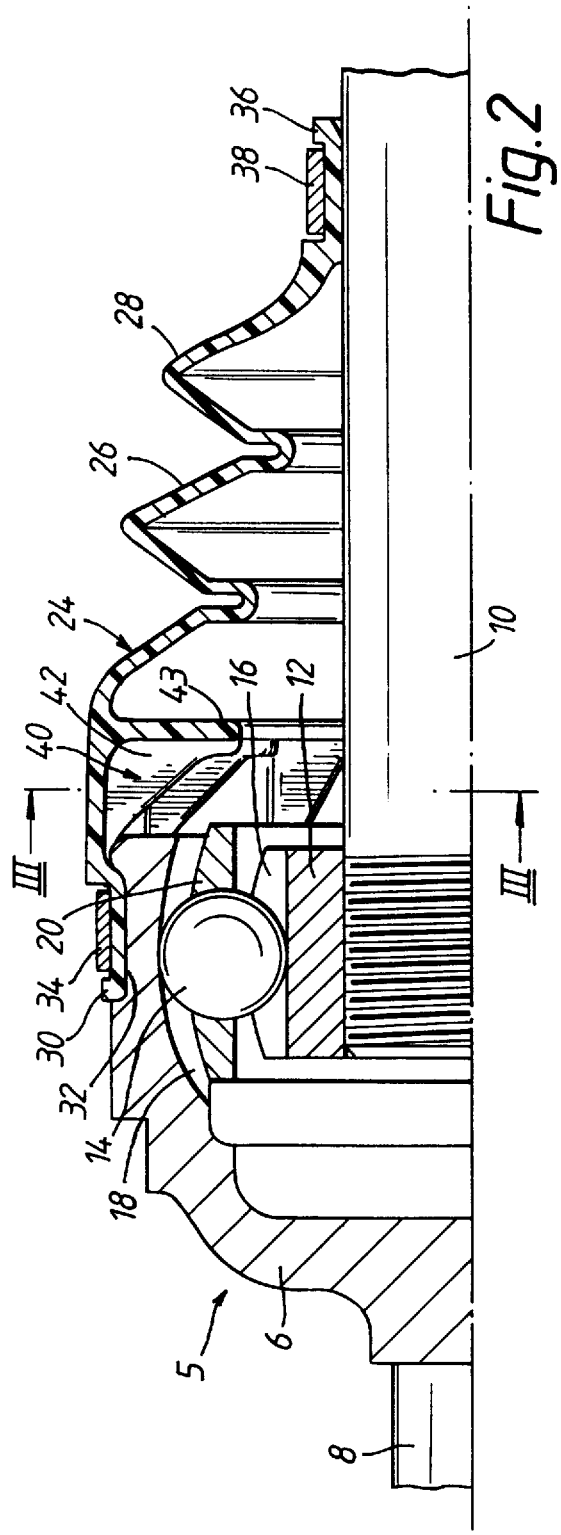

PROTECTIVE BELLOWS

The invention relates to a protective bellows having an end fitted to and protecting the open end of the casing of an articulated transmission joint which incorporates individual rotary elements permitting angular movement of the joint, the bellows having an integral zone extending around the inside of the bellows adjacent the bellows end and adjacent to the open end of the casing of the joint to which that bellows end is fitted, the integral zone comprising material which extends both radially inwards of the bellows and axially towards the said bellows end so as to be contacted by a rotary element dislodged from the joint.

Such a bellows is known, for example, from DE-A-2 927 648. In this bellows, the integral zone is reinforced by a metal cap which is clipped to the open end of the casing of the transmission joint and has a portion extending in a radially inward direction partway across the open end of the casing so as to reinforce the integral zone of the bellows. A dislodged rotary element of the joint is therefore blocked against further dislodgement by the reinforcing effect of this radially directed portion of the metal end cap. Such a metal cap adds weight, complexity and cost and may locally adversely affect the flexibility of the bellows. The invention aims to overcome these problems.

According to the invention, therefore, the known form of bellows as first set forth above is characterised in that the integral zone is devoid of separate reinforcement whereby it alone prevents further dislodgement of the rotary element.

Protective bellows embodying the invention will now be described, by way of example only, with reference to the accompanying diagrammatic drawings in which:

FIG. 1 is a longitudinal half-section through one of the bellows embodying the invention, shown fitted to an articulated transmission joint;

FIG. 2 corresponds to FIG. 1 but shows a modified form of the bellows of FIG. 1; and FIG. 3 is a cross-section on the line III—III of FIG. 2.

FIG. 1 shows in diagrammatic form an articulated joint 5 of the transmission system of a motor vehicle. The joint 5 is in the form of a bowl-shaped casing 6 which is connected to an input shaft 8 so that the casing 6 rotates with the input shaft 8. The joint 5 has an output shaft 10 connected (in this example) to one of the driving wheels of the vehicle. The shaft 10 is rigid with an inner element 12 supporting a plurality of balls 14 (of which only one is shown in the drawing) each of which engages in a groove 16 in the element 12 and also in a groove 18 on the inside surface of the casing 6. The balls 14 are further supported in a cage 20. Therefore, as the casing 6 is rotated by the input shaft 8, this rotational movement is transmitted to the output shaft 10 via the grooves 18 and 16 and the balls 14. The balls 14 may be replaced by rollers.

In known manner, the provision of the balls 14 enables angular movement between the axis of the output shaft 10 and the axis of the input shaft 8 to take place, up to a maximum of about 50 degrees, thereby accommodating corresponding movement of the road wheel.

In order to protect the mechanism of the joint 5 from the effects of moisture and dirt and other contamination, a protective bellows 24 is provided. This bellows is advantageously produced by blow moulding from thermoplastics material. It comprises a number of individual bellows turns 26,28 which integrally extend between the two ends of the bellows. At one end of the bellows, a large diameter fixing collar 30 is provided which locates in a groove 32 on the outside of the casing 6 and is firmly secured in position by an annular clamp 34. At the opposite end of the bellows, a small diameter fixing collar 36 is provided which is clamped around the outside of the shaft 10 by a fixing clamp 38.

In addition to the angular movement permitted by the joint 5, it is normal in such joints to permit small limited movement of the shaft 10 in an axial direction relative to the casing 6. During such axial movement, the inner element 12 moves with the shaft 10, and the permitted amount of axial movement may be of the order of 40 to 60 millimetres although in practice only 5 to 15 millimetres of movement may take place. Although this permitted axial extension is advantageous in accommodating corresponding axial movement of the shaft 10, it is disadvantageous in that there is a risk that, at the extreme limit of the extension, the balls 14 may become dislodged from their grooves 16,18. Clearly, this renders the joint 5 inoperative. If such dislodgement takes place during assembly of the joint onto the vehicle, it requires skilled rectification by an expert. If it takes place during operation of the vehicle, it will be damaging and dangerous.

In order to deal with this problem, the bellows 24 of FIG. 1 is provided with a rigid zone 40 which extends integrally and radially inward of the bellows adjacent its large diameter end so as to comprise a portion directed towards the shaft 10 and a portion directed towards the balls 14. This rigid zone provides an inclined barrier extending partway across the open mouth of the casing 6 and positively prevents dislodgement of the balls 14 out of this mouth.

The rigid zone 40 can be produced by injection moulding, with the remainder of the bellows being subsequently produced by blow moulding. The shape and size of the zone 40 can be varied according to the type and size of the joint 5 and the size of the balls (or rollers). In addition, the radially inward extension of the rigid zone 40 can be adjusted to allow the amount of angular movement permitted for the axis of the shaft 10.

FIGS. 2 and 3 show a modified arrangement in which the rigid zone 40 is of reduced mass and thickness, comprising radially directed and circumferentially separated webs 42. The spacing between the webs 42 is less than the diameter or cross-section and size of the balls 14. The webs 42 are strengthened by a radially and circumferentially extending wall 43, but this may be omitted if desired. The zone 40 of FIGS. 2 and 3 operates in the same way as the zone 40 of FIG. 1 but has the advantage of reduced weight and cost.

The arrangements illustrated provide a very economic and effective way of preventing dislodgement of the balls or rollers of a universal joint when axial movement of the transmission shaft takes place. The rigid zones 40 can be produced at very small additional cost when the bellows is moulded. The operation of fixing the bellows in position on the vehicle is unaffected by the provision of the rigid zones 40. The arrangement is thus very advantageous as compared with the provision of a rigid metal cap which has hitherto been fitted over the open end of the casing 6 of the joint 5 for preventing axial dislodgement of the balls or rollers. Such a cap has to be clipped over the open end of the casing 6 and secured in position by suitable means, necessitating a separate fixing operation after the joint has been fitted in position and before the bellows is fitted. Furthermore, this metal cap is relatively more expensive and heavier than the rigid zones 40. In addition, the use of the separate metal caps is disadvantageous because it requires an additional part to be ordered and stored.

It is claimed:

1. In combination, a protective bellows and an articulated transmission joint having a casing which has an open end and which incorporates individual rotary elements permitting angular movement of the joint, the protective bellows having an end fitted to and protecting the open end of the casing of the articulated transmission joint, the bellows having an integral zone extending around the inside of the bellows adjacent said end of the bellows and adjacent said open end of the casing, the integral zone comprising material which extends both radially inwards of the bellows and axially towards said end of the bellows so as to be contacted by one of the rotary elements when dislodged from the joint, the integral zone being substantially rigid and devoid of separate reinforcement whereby it alone prevents further dislodgement of the rotary element.

2. The combination according to claim 1, characterised in that the rotary elements are balls.

3. The combination according to claim 1, characterised in that the rotary elements are rollers.

4. The combination according to claim 1, characterised in that the integral zone comprises solid material extending circumferentially around said end of the bellows and providing a surface which is inclined inwardly of the bellows in a direction towards the axis of the bellows.

5. The combination according to claim 1, characterised in that the integral zone comprises a plurality of, integral webs spaced circumferentially from each other around said end of the bellows.

6. The combination according to claim 5, characterised in that the spacing in a circumferential direction around the bellows between adjacent webs is less than the cross-sectional size which each of the rotary elements presents in a direction axially of the bellows.

7. The combination according to claim 5, characterised in that the integral zone incorporates a radially directed wall portion extending circumferentially around the bellows and integrally connected to and supporting the webs.

8. The combination according to claim 5, characterised in that each web has an edge surface facing generally towards said end of the bellows and extending from said end of the bellows in an inclined direction towards the axis of the bellows.

9. The combination according to claim 1, characterised in that the bellows is produced from thermoplastic material.

10. The combination according to claim 9, characterised in that the bellows comprises a plurality of bellows turns which are produced by blow-moulding and in that the rigid zone is produced by injection-moulding.

11. In combination, a protective bellows and an articulated transmission joint having a casing which has an open end and which incorporates individual rotary elements permitting angular movement of the joint, the protective bellows having an end fitted to and protecting, the open end of the casing of the articulated transmission joint, the bellows having an integral zone extending around the inside of the bellows adjacent said end of the bellows and adjacent said open end of the casing, the integral zone comprising material which extends both radially inwards of the bellows and axially towards said end of the bellows so as to be contacted by one of the rotary elements when dislodged from the joint, the integral zone being devoid of separate reinforcement whereby it alone prevents further dislodgement of the rotary element, the integral zone comprising a plurality of integral webs spaced circumferentially apart from each other around said end of the bellows.

12. The combination according to claim 11, characterised in that the spacing in a circumferential direction around the bellows between adjacent webs is less than the cross-sectional area which each of the rotary elements presents in a direction axially of the bellows.

13. The combination according to claim 11, characterised in that the integral zone incorporates a radially directed wall portion extending circumferentially around the bellows and integrally connecting,to and supporting the webs.

14. The combination according to claim 11, characterised in that each web has an edge surface facing generally towards said end of the bellows and extending from said end of the bellows in an inclined direction towards the axis of the bellows.

15. The combination according to claim 11, characterised in that the bellows is produced from thermoplastics material.

16. The combination according to claim 15, characterised in that the bellows comprises a plurality of bellows turns which are produced by blow-moulding and in that the rigid zone is produced by injection-moulding.

17. A combination according to claim 11, characterised in that the integral zone comprises substantially rigid solid material extending circumferentially around said end of the bellows and providing a surface which is inclined inwardly of the bellows in a direction towards the axis of the bellows.

* * * * *